(12) United States Patent
Rawlings et al.

(10) Patent No.: US 9,371,141 B2
(45) Date of Patent: *Jun. 21, 2016

(54) REDUCED SOLAR ABSORPTIVITY APPLIQUE HAVING SPACED RIBLETS WITH PIGMENTED COLORATION

(71) Applicants: Diane C. Rawlings, Bellevue, WA (US); George M. Roe, Seattle, WA (US); Peter C. Keller, Federal Way, WA (US)

(72) Inventors: Diane C. Rawlings, Bellevue, WA (US); George M. Roe, Seattle, WA (US); Peter C. Keller, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/284,175

(22) Filed: May 21, 2014

(65) Prior Publication Data

US 2014/0295143 A1    Oct. 2, 2014

Related U.S. Application Data

(62) Division of application No. 12/629,803, filed on Dec. 2, 2009, now Pat. No. 8,733,702.

(51) Int. Cl.
| | | |
|---|---|---|
| *B64C 1/00* | (2006.01) | |
| *B64D 45/02* | (2006.01) | |
| *B64C 21/10* | (2006.01) | |
| *B64C 23/00* | (2006.01) | |

(52) U.S. Cl.
CPC ............... *B64D 45/02* (2013.01); *B64C 21/10* (2013.01); *B64C 23/005* (2013.01); *B64C 2230/26* (2013.01); *Y02B 10/30* (2013.01); *Y02T 50/166* (2013.01); *Y10T 428/24479* (2015.01); *Y10T 428/24579* (2015.01)

(58) Field of Classification Search
None
See application file for complete search history.

(56) References Cited

U.S. PATENT DOCUMENTS

| | | | | | |
|---|---|---|---|---|---|
| 4,736,912 | A * | 4/1988 | Loebert | ...................... | B63B 1/34 114/67 R |
| 4,947,785 | A * | 8/1990 | Milne | ....................... | B63B 5/24 114/357 |
| 5,054,412 | A * | 10/1991 | Reed | ........................ | B63B 1/38 114/289 |
| 5,069,403 | A * | 12/1991 | Marentic | .................. | B05D 5/02 244/130 |
| 5,386,955 | A * | 2/1995 | Savill | ........................ | B63B 1/34 138/38 |
| 5,988,568 | A * | 11/1999 | Drews | ..................... | B64C 21/10 244/130 |
| 6,177,189 | B1 * | 1/2001 | Rawlings | .................. | C09J 7/026 156/304.3 |
| 6,280,847 | B1 * | 8/2001 | Corkhill | ............ | B32B 17/10036 296/146.1 |
| 6,994,045 | B2 * | 2/2006 | Paszkowski | .............. | B63B 1/38 114/67 R |
| 8,733,702 | B1 * | 5/2014 | Rawlings | .............. | B64C 23/005 156/230 |
| 8,939,410 | B2 * | 1/2015 | Exton | ..................... | B64C 21/10 244/130 |
| 2003/0152766 | A1 * | 8/2003 | Vargo | ........................ | B32B 7/12 428/343 |
| 2004/0071916 | A1 * | 4/2004 | Romanowski | ........... | A62D 5/00 428/40.1 |
| 2004/0126541 | A1 * | 7/2004 | Dietz | ....................... | B63B 1/36 428/167 |

(Continued)

*Primary Examiner* — Medhat Badawi
(74) *Attorney, Agent, or Firm* — Felix L. Fischer

(57) ABSTRACT

A reduced solar absorptivity appliqué having a surface layer for adhering to an surface and high aspect ratio microstructures extending from the surface layer having pigmentation or spectral tailoring.

7 Claims, 11 Drawing Sheets

(56) References Cited

U.S. PATENT DOCUMENTS

| | | | | |
|---|---|---|---|---|
| 2004/0200932 A1* | 10/2004 | Scott | B64C 23/005 | 244/206 |
| 2006/0060722 A1* | 3/2006 | Choi | B64C 21/10 | 244/200.1 |
| 2007/0257400 A1* | 11/2007 | Stenzel | B29C 59/022 | 264/293 |
| 2008/0061192 A1* | 3/2008 | Sullivan | B64C 21/10 | 244/200 |
| 2008/0226843 A1* | 9/2008 | Fukubayashi | B23K 26/34 | 427/597 |
| 2008/0233356 A1* | 9/2008 | Loher | B05D 1/28 | 428/172 |
| 2009/0258221 A1* | 10/2009 | Diehl | G02B 5/0866 | 428/332 |
| 2010/0080958 A1* | 4/2010 | Goelling | B32B 15/08 | 428/172 |
| 2010/0108813 A1* | 5/2010 | Lang | B63B 1/36 | 244/130 |
| 2010/0127125 A1* | 5/2010 | Li | B21B 1/227 | 244/119 |
| 2010/0263898 A1* | 10/2010 | Hebert | B64C 1/12 | 174/2 |
| 2010/0264665 A1* | 10/2010 | Hebert | B64C 1/12 | 290/55 |
| 2011/0186685 A1* | 8/2011 | Tsotsis | B64C 21/10 | 244/130 |
| 2011/0274875 A1* | 11/2011 | Lang | B64C 21/10 | 428/119 |
| 2012/0199198 A1* | 8/2012 | Hebrink | C08G 18/246 | 136/259 |
| 2013/0156595 A1* | 6/2013 | Sander | F01D 5/14 | 416/241 R |

* cited by examiner

REDUCED SOLAR ABSORPTIVITY APPLIQUE HAVING SPACED RIBLETS WITH PIGMENTED COLORATION

REFERENCE TO RELATED APPLICATIONS

This application is a divisional application of Ser. No. 12/629,803 filed on Dec. 2, 2009 entitled REDUCED SOLAR ABSORPTIVITY APPLIQUE', the disclosure of which is incorporated herein by reference.

BACKGROUND INFORMATION

1. Field

Embodiments of the disclosure relate generally to the field of reduction of solar absorptivity in surfaces and more particularly to embodiments and fabrication methods for use of riblets or other high-aspect-ratio (height to base) surface microstructures having coloring and spectral tailoring for reduced solar absorptivity extending from a base layer.

2. Background

Strength and durability of composite structures may be impacted by excessive heating due to effects of solar absorptivity of the surface of the structure or coatings applied to the surface due to color or spectral properties. Reducing solar absorptivity of the exterior surface/paint/appliqué is an approach to reduce the solar heating issue. Use of low solar absorptivity coloration of coatings such as "bright white" paint, appliqués or matrix impregnation reduces the impact of solar heating. However, many applications for structural composites are enhanced by various coloration of the surface other than bright white. However, nearly half of the energy in the solar spectrum is in the visible, so the solar absorptivity is very sensitive to visual color and intensity. Dark colors absorb almost all of the energy in the visible band, and they usually absorb a high percentage of the solar energy in the Near Infrared and UV as well, resulting in excessive heating of the surfaces. To accommodate the additional thermal load due to solar heating, additional structural strength may be required which may impact weight and cost. Significant benefit has previously be obtained by spectrally tailoring the optical properties of a paint or coating, i.e. reflecting the UV and/or Near Infrared while allowing only the visible absorption (so that the desired colors are still possible) while reducing the requirement for structural enhancement. This approach has been used to design, scale up and manufacture a paint coating to reduce the thermal load on aircraft structures when the aircraft could not be white. Often greater reductions are needed than can be achieved by tailoring surface solar absorptivity alone.

Increasing fuel efficiency in modern aircraft is being accomplished through improvement in aerodynamic performance and reduction of structural weight. Recent advances in the use of microstructures such as riblets on aerodynamic surfaces have shown significant promise in reducing drag to assist in reducing fuel usage. Riblets have various forms but advantageous embodiments may be ridge-like structures that minimize drag on the surface of an aircraft. Riblets may be used in areas of a surface of an aircraft where turbulent regions may be present. Riblets may limit circulation causing a breakup of large scale vortices in these turbulent regions near the surface in the boundary layer to reduce drag. In certain tested applications riblets have been pyramidal or inverted V shaped ridges spaced on the aerodynamic surface to extend along the surface in the direction of fluid flow. Riblet structures have typically employed polymeric materials, typically thermoplastic or thermoset polymers.

Surface appliqués for lightning protection, EMI shielding, P-static mitigation and replacement of the decorative/protective paint are being employed on aircraft and other vehicles.

It would therefore be desirable for an appliqué with multiple functions including reducing solar heating, aerodynamic drag reduction, lightning protection, EMI shielding, P-static mitigation and paint replacement.

SUMMARY

Exemplary embodiments provide an array of riblets having a bright white surface layer and spaced tips with pigmented coloration extending from the surface layer. In certain embodiments the array of riblets and surface layer may be incorporated in an appliqué.

In certain configurations, the appliqué includes additional layers such as a metallic layer, a polymer support layer and an adhesive layer applied to the surface layer opposite the riblet tips. These additional layers may be comparable to preexisting lightning strike appliqués. Materials for the surface layer and riblet tips may include high elongation elastomers selected from the set of thermosetting or thermoplastic polymers urethane, epoxy fluoroelastomers, perfluoroether, fluorosilicone, polysulfide, silicones, EPDM elastomers, or other non-elastomeric polymers of these same classes. In alternative configurations, the riblet tips may be formed from such materials as nickel, chromium, metal alloys, glasses, or ceramics such as silicon carbide or silicon nitride.

A cladding on the riblet tips may also be employed for spectral tailoring or for increased durability, for example to add a UV barrier. In one configuration, a cladding of quantum dots is an example embodiment.

Fabrication of a reduced solar absorptivity appliqué may be accomplished by forming a complementary tool from a master tool to provide grooves and intermediate flat surfaces and depositing riblet tips having spectral tailoring in the grooves of the complementary tool and depositing a surface layer overlaying the tips and intermediate flat surfaces of the complementary tool. An adhesive layer and other layers such as a metallic layer and polymer support layer may be deposited to from an appliqué. The appliqué is then removed from the complementary tool and adhered to an aerodynamic surface or may be adhered to the aircraft surface with the complementary tool in place and this tool is removed at a later time.

A cladding for spectral tailoring may be deposited in the grooves of the complementary tool prior to deposition of the riblet tips.

The features, functions, and advantages that have been discussed can be achieved independently in various embodiments of the present invention or may be combined in yet other embodiments farther details of which can be seen with reference to the following description and drawings

DETAILED DESCRIPTION

The embodiments disclosed herein provide high aspect ratio surface microstructures such as aerodynamic riblets extending from a surface layer in an appliqué designed for reduced solar absorptivity while maintaining maximum durability. For exemplary purposes the embodiments disclosed herein are shown in use with aircraft as aerodynamic riblets. However, non-aircraft use of the described appliqués is equally applicable. The microstructures disclosed herein as exemplary riblets may be other shapes and patterns that are not typically used for drag reduction on airplanes. For example a three dimensional (3D) pattern of protrusions that block the direct view of the surface from the sun from many angles, have minimal thermal contact area of the microstructure tip with the flat surface, and/or provide spectrally tailored "tips" and "surfaces" to mitigate the solar absorption. For example, rows of bumps of similar height and spacing as suggested for the riblets examples provided herein may be employed. For non-airplane applications, these 3D structures could be more advantageous because they can function the same from all azimuthal angles where the solar loading of the ridge/groove type of riblet may be somewhat affected by the sun orientation relative to the surface.

The appliqué may be multilayered to additionally provide one or more conductive layers for lightning strike protection, EMI shielding and P-static migration. Reduced thermal loading of underlying structure is achieved by isolating the absorption and decorative color (which constitutes the primary solar absorber) into the riblet ridges, reducing the heat transfer to the underlying appliqué and aircraft structure. The riblets additionally enhance the ambient cooling by increasing surface area.

The embodiments disclosed herein may employ a parabolic section particularly applicable for both high elongation elastomeric materials and rigid materials for aerodynamic riblets that may be impacted by ground support equipment or environmental hazards such as hail to enhance deformation recovery and avoid permanent deformation/damage. These embodiments also allow an optimized structural design of riblets providing the capability for the riblets to be thinner and more aerodynamically efficient. Non-elastomeric polymers as well as rigid materials including metals or ceramics with a small elastic region would normally be deformed in a non-recoverable manner when a force is applied to the riblet tip may more readily be employed with the parabolic section.

Figure 1A:
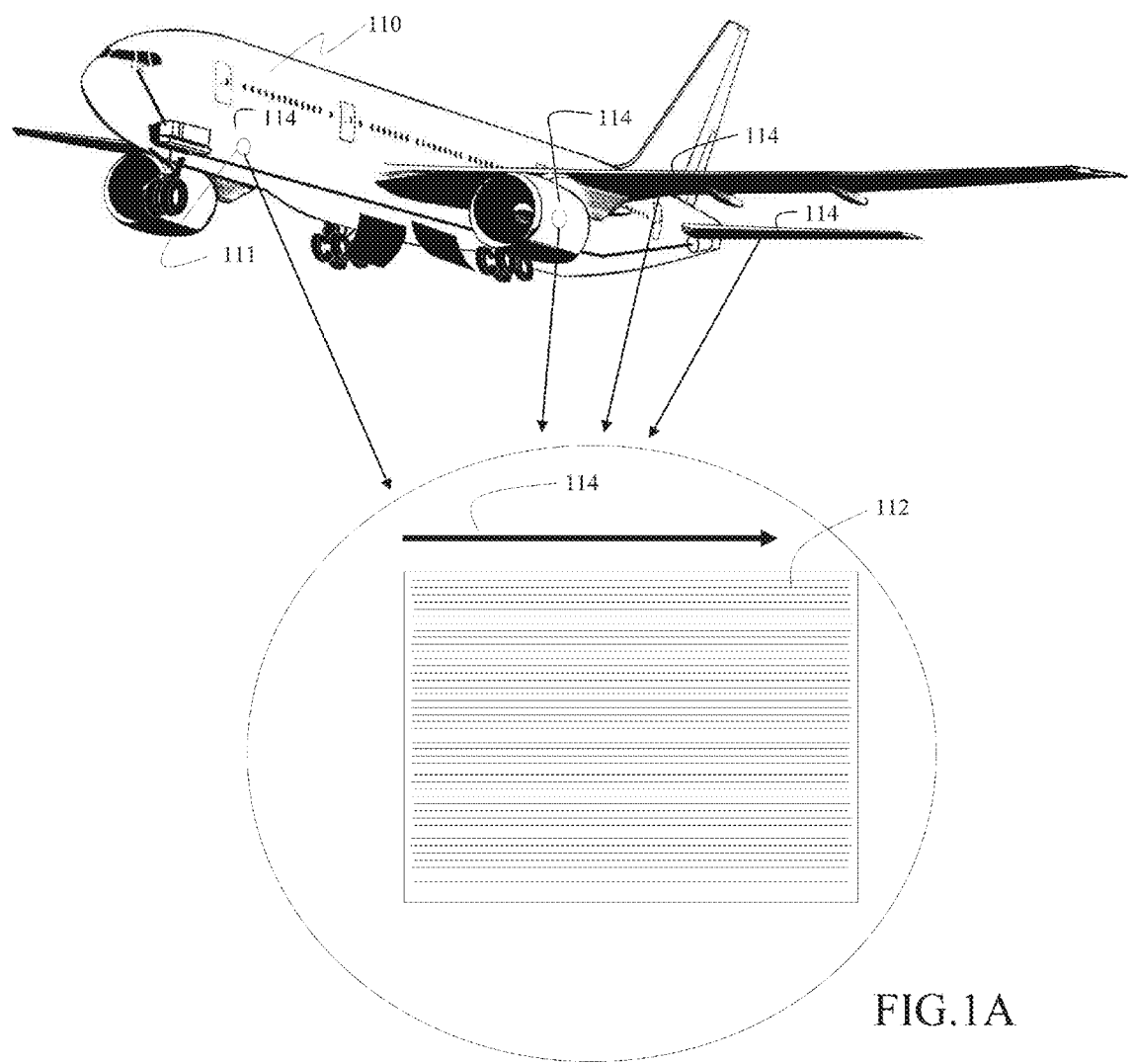
FIG. 1A is an isometric view of a portion of an aerodynamic surface such as a wing or fuselage skin showing exemplary aerodynamic riblets extending in the flow direction.
Figure 1B:
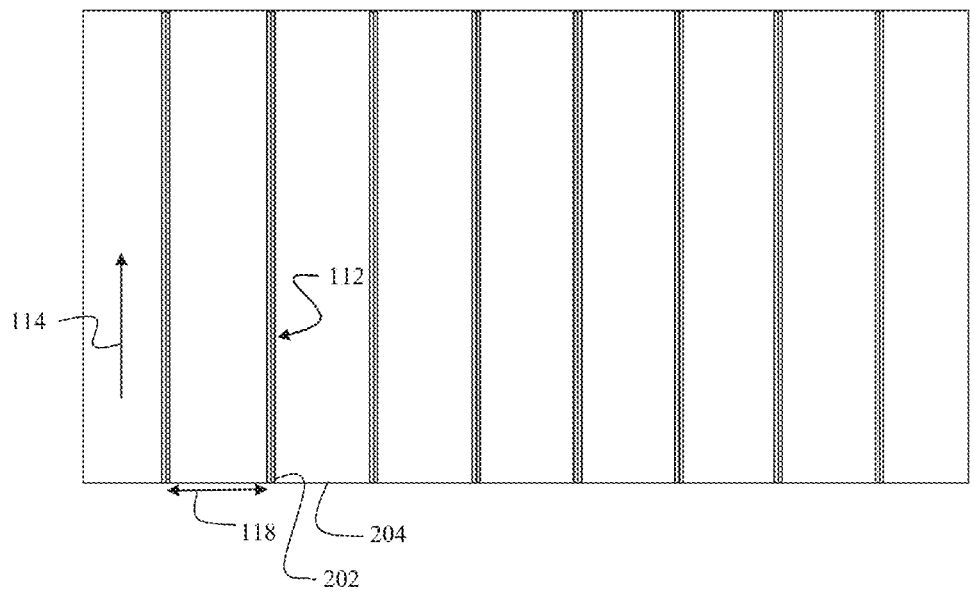
FIG. 1B is a top view of a portion of an aerodynamic surface employing riblets of the first embodiment as shown in FIG. 1A.
Figure 1C:
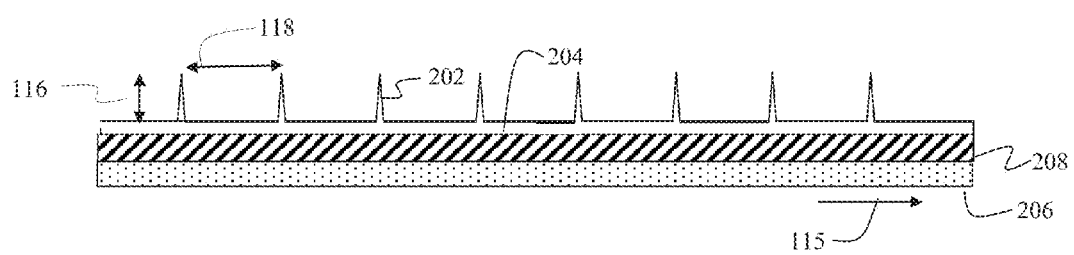
FIG. 1C is a section view comparable to FIG. 1A for reference with the features of FIG. 1B.

An exemplary embodiment of riblets having a structure as will be described in greater detail subsequently is shown as a portion of an aerodynamic surface for an aircraft as shown in FIG. 1A. The aircraft 110 employs a structure with an aerodynamic surface 111, shown enlarged, having multiple substantially parallel riblets 112 arranged parallel to the flow direction as represented by arrow 114. For the exemplary embodiment shown in FIGS. 1B and 1C, the height dimension 116 perpendicular to the surface 111 is approximately 0.002 to 0.05 inch with a base of from 0.0004 to 0.010 inch with an aspect ratio of about 3 to 6 or greater while the spacing 118 between the riblets is approximately 0.003 inch. Spacing or distribution of the riblet tips 202 protruding from a supporting surface layer 204 in an array may vary depending on and be predetermined by the desired thermal properties to be obtained and, in a multifunction appliqué, the fluid dynamic properties of the air, water or other fluid for which the application of riblets is employed. Typically, a narrow base dimension 113 for the riblet tips 202 is desirable to reduce heat transfer from the riblet to the surface layer 204. Returning to FIG. 1A, the aerodynamic surface is typically, without limitation, curved and may be a portion of a wing, an engine nacelle, a control surface, a fuselage or other suitable surface. Therefore flexibility and conformability of the riblets and any structure supporting and affixing the riblets to the surface may be required. While described herein with respect to an aircraft aerodynamic surface the embodiments disclosed herein are equally applicable for drag reduction on surfaces of other aerospace vehicles such as, without limitation, missiles or rockets and other vehicles such as cars, trucks, buses and trains which employ composite structures or otherwise require reduced solar absorptivity for thermal performance enhancement.

Figure 1D:
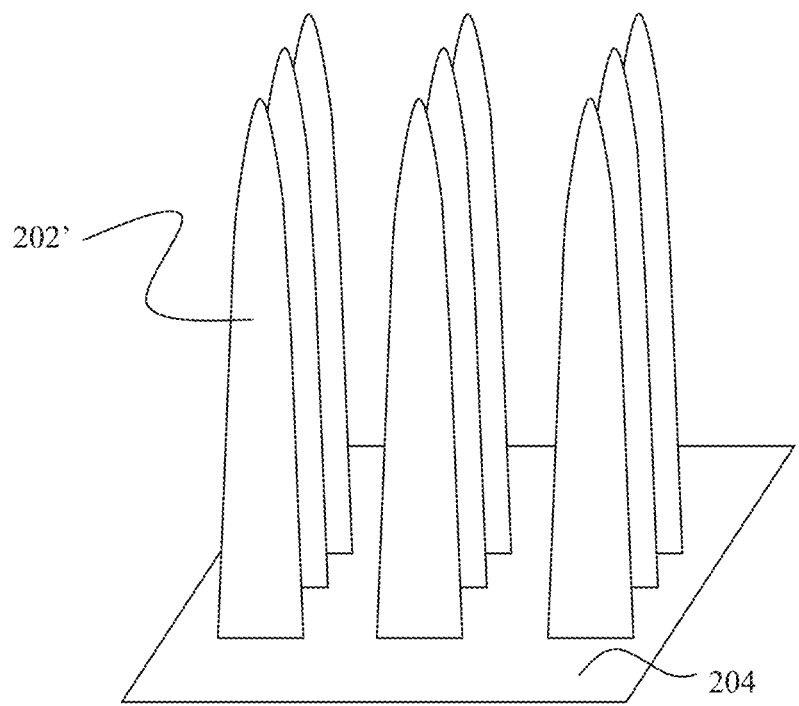
FIG. 1D is a perspective view of an alternative embodiment of the high aspect ratio microstructures extending from the surface layer.

As previously described, alternative microstructural shapes may be employed. FIG. 1D shows an alternative form for the protruding microstructural tips 202' extending from the surface layer 204.

The embodiments disclosed herein recognize and provide the capability for riblets that may resist various impacts and/or other forces that may reduce riblet durability. Further, certain of the different advantageous embodiments provide a multi-layer structure that may have a surface layer 204 and a plurality of riblet tips 202 located on or extending from the supporting surface layer. In exemplary embodiments described in detail subsequently, the structures which form the riblets may be fabricated from high elongation elastomeric materials. The embodiments shown are also applicable for rigid tipped riblets or shape memory riblets for additional structural capability.

Figure 2:
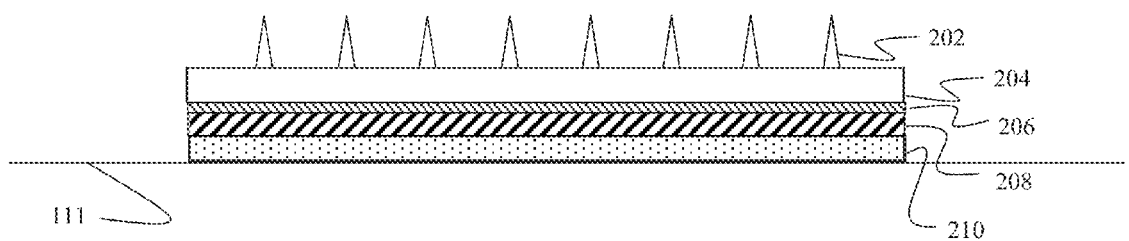
FIG. 2 is a section view of a multilayer appliqué embodiment.

An embodiment for an appliqué with reduced solar absorptivity riblets is shown in FIG. 2 as a multilayer construction. Individual tips 202 of the riblets, protrude from surface layer 204. A multilayer structure incorporating a screen and/or foil metallic layer 206 such as aluminum, a polymer support layer 208 and an adhesive layer 210 supports the surface layer 204. The polymer support layer 208 and adhesive layer 210, with or without the metallic layer 206 may be supplied as a portion of a preformed appliqué or directly deposited on the surface layer 204 as will be described in greater detail subsequently. The metallic layer 206 provides a conducting material for lightning strike protection in an exemplary aircraft usage of the embodiment. The metallic, polymer support and adhesive multilayer structure may be comparable to a current lightning strike appliqué (LSA) employed for composite aircraft structural surfaces.

For an exemplary configuration for the embodiment shown in FIG. 2, the surface layer 204 is approximately 2 mils in thickness and has a bright white coloration. The riblet tips 202 are approximately 2 mils in height and spaced approximately 3 mils apart consistent with exemplary requirements for an aerodynamic riblet appliqué. The riblet tips contain the sole coloration, in the embodiment shown a red pigmentation. The colored riblet surfaces are created by ink, dyes or pigmentation of the riblet polymer or surface coating using pigmentation selected for light fastness as well as color (absorptivity in the visible spectrum) and for lack of absorptivity in the near infrared and near ultraviolet (UV). Example pigments are inorganics such as iron oxide yellow and many organics including perylene black such as BASF Euvinyl C Black 00-8702; perylene reds such as Pigment Red 179 (Perrindo Maroon 179) from Sun Chemical; Pigment Red 178 from BASF; Sandorin Reds and Oranges; Toluidine Red (Pigment Red 3); Diazo Condensation Pigments such as Pigment Red 165-166 or 220-221 or Pigment Yellow 93-95 or 128; Quinacridone pigments such as Pigment Red 202 or violet 19); Carbazole Dioxazine Violet; Benzimidazolone pigments; Alizarine Lake Reds; Permanent Red; Lithol Red (Pigment Red 49); Anthraquinone pigments; or blue or green phthalocyanine pigments for example copper phthalocyanine from suppliers such as BASF (Euvinyl C Blue 69-0202). Stable yellow organics transparent in the near infrared are also available, for example Sandorin Yellows; or Hansa or other Diarylide Yellows (Pigment yellow 1,3,65,73,74,75,97,98) or oranges; Isolindoline-based pigments such as Pigment Orange 66; or Pigment Yellow 139 (Paliotol Yellow L 1820 from BASF); and tetrachloroisoindolinone-based pigments such as Pigment Yellow 110. Alternatively, the coloring material may be absorptive in the visible regions of interest and reflective in the near infrared or UV due to scattering (a result of the particulate size and high index of refraction). Example of pigments that are absorptive in the visible but reflective in the near infrared are chromium oxide (Pigment Green 17; lead chrome (Pigment Yellow 34, Pigment Red 104, Pigment Orange 21; Molybdate Orange (Pigment Red 104); cadmium sulfide pigments such as Pigment Yellow 37, Pigment Orange 20 and Pigment Red 108; a select set of mixed metal oxide pigments for example chrome titanate yellow; and bismuth vanadate/molybdate pigments (Pigment Yellow 184).

For the embodiment shown in FIG. 2 the surface layer 204 may be selected from various polymers pigmented with materials such as inks, elastomers including polyurethanes, polyureas, polysulfides, epoxy-based elastomers, silicones, fluoroelastomers such as perfluoroether, fluorosilicones, EPDM elastomers, or from non-elastomeric polymers including thermosets and thermoplastics including materials such as polyurethanes, polyureas, epoxy, fluorinated polymers such as fluorinated ethylene propylene (FEP), polyolefins, polyetheretherketone (PEEK), Polyetherketoneketone (PEKK) or polyamide. The surface layer may be transparent with an underlying white or bright metallic reflector such as aluminum. The white surface is typically generated by ink, dyes or pigmentation of the surface polymer using bright white pigments such as titanium dioxide, zinc oxide, zinc sulfide, antimony oxide, zirconium oxide or other particulate with a high index of refraction and a size range that maximizes reflection in the UV, visible and near infrared, typically 0.1-0.5 micrometers. The riblet tips 202 may be of various materials including polymers identical to or comparable to those described and used on the surface layer 204. For certain of the embodiments herein the riblets may be made of an elastomer or a very high modulus material, however the surface layer may actually provide better overall performance if it is not an elastomer. These polymers may be loaded during casting with the desired pigmentation as described above. Alternatively, the riblet tips 202 may employ glass, ceramics, chromium, other metal alloys, silicon carbide or silicon nitride which may be treated to provide the desired coloration or naturally provide a coloration effect. While silicon carbide and nitride will be quite dark such properties may be desirable for certain applications. The adhesive layer 210 may be one of many possibilities including, without limitation, pressure sensitive acrylic adhesives, polyurethane pressure sensitive adhesives, polysulfide, epoxy, thermoplastics, thermally-reactive adhesives, silicone adhesives, or fluorosilicone adhesives. The polymer support layer 208 may be a single layer or multiple layers fabricated from polyetheretherketone (PEEK), polyamide, polyester, polyolefin or similar polymer film.

Figure 3:
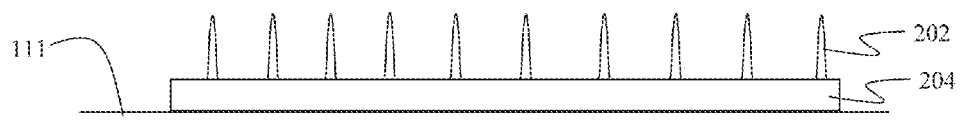
FIG. 3 is a section view of a simplified embodiment with direct adherence of the surface layer to the aerodynamic surface.

In alternative embodiments, various layers of the embodiment shown in FIG. 2 may be eliminated depending on the intended application. In a simple form an appliqué 300 may be formed solely by the surface layer 204 and riblet tips 202 as shown in FIG. 3. The surface layer may employ a thermoplastic which may be directly adhered to the aircraft surface. FIG. 3 additionally shows the use of a parabolic profile for the riblets providing improved structural capability as disclosed in co-pending U.S. patent application Ser. No. 12/566,907 filed on Sep. 25, 2009 entitled Structurally Designed Aerodynamic Riblets.

Additionally, the surface layer in the embodiments described previously may be spectrally tailored as well with pigments or processes as described for the riblet tips. Spectral tailoring of the surface layer may provide low solar absorption/high solar reflection and may or may not be the same color as the riblet tip for decorative purposes or to enhance overall performance. The surface layer may be bright white or a bright metallic as previously described or could be a transparent layer with a white or other bright reflector present on a lower layer such as a metallic layer in the appliqué or on the surface to which the riblet appliqué is attached. As will be described subsequently, quantum dots that absorb UV and emit in the visible or near infrared may also be applied to the surface layer or surface claddings applied in a manner similar to the riblets.

Figure 4:
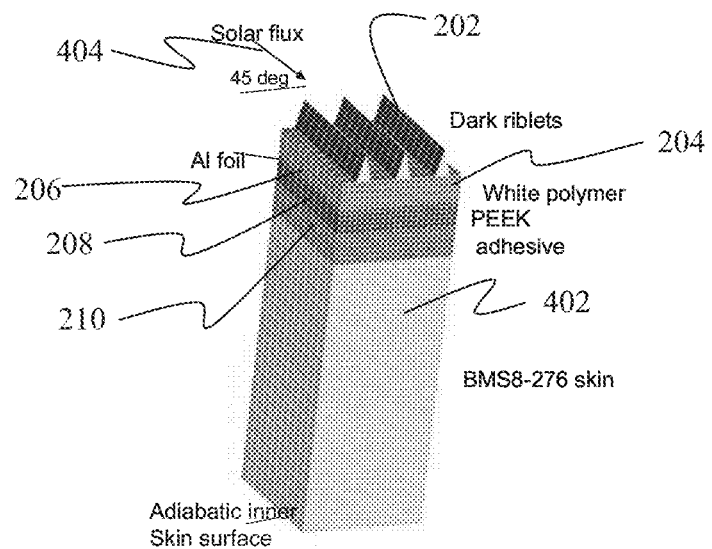
FIG. 4 is an isometric cutout of a vehicle surface with an appliqué of the embodiment of FIG. 2 installed.
Figure 5A:
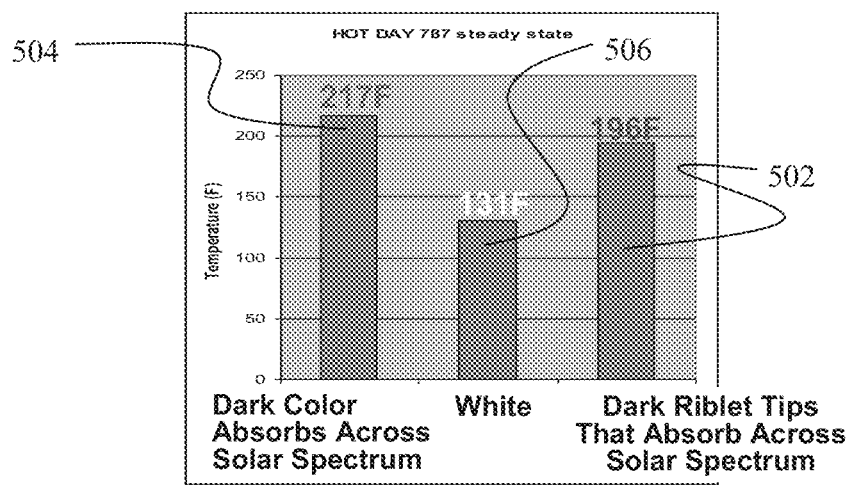
FIG. 5A is a bar graph comparing temperatures on a typical surface for which the present embodiments would be employed with a bright white surface coating, colored paint and riblet appliqué.

Analysis of the exemplary appliqué configuration of FIG. 2 shown in section as applied to a composite fiber reinforced polymer (CFRP) aircraft structural skin 402 formed of BMS8-276 as shown in FIG. 4 has been conducted for a normal solar spectral radiance with approximately 7% Ultraviolet, 47% visible and 46% near Infrared radiation components and employing an exemplary 45 degree angle of incidence for solar radiation 404, As shown in FIG. 5A, a 21-degree F. reduction in the composite skin surface temperature to 196 F, bar 502, due to the presence of the multicolored riblet as compared to a conventional color coating of the same dark color which would have a surface temperature of 217 F, bar 504. A bright white coating would have a temperature of 131 F, bar 506. No special tailoring of UV, Visible or Near IR absorption was included for the exemplary analysis of FIG.

Figure 5B:
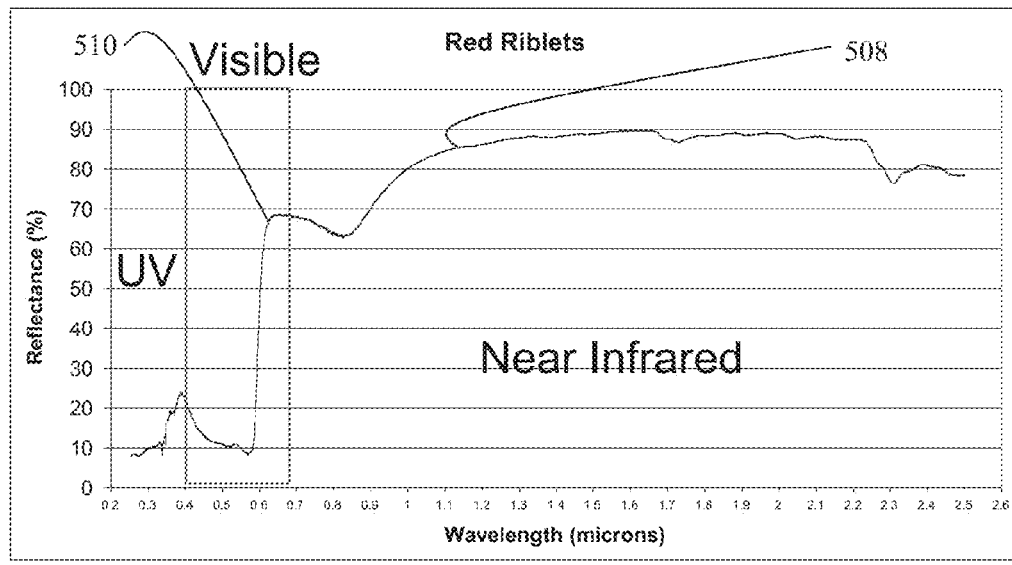
FIG. 5B is a graph of reflectance for the representative riblet tip coloration.

5A. The resulting spectral reflectance 508 of the exemplary riblets is shown in FIG. 5B. The riblet tips can be pigmented using a combination of pigments that provide the desired visual color (in this case red, showing a relative increase in the reflectivity, portion 510, in the red part of the visible spectrum) while maximizing the reflection or minimizing the absorption in the Near Infrared and UV. In the example embodiment described, perylene reds such as Pigment Red 179 (Perrindo Maroon 179) from Sun Chemical or Pigment Red 178 from BASF are employed. However, alternative colors/pigments as described above may be employed. UV reflections can be increased by the selection of less typical coating elements, as will be described in greater detail subsequently, and spectral tailoring of the riblet to reduce the solar band absorptions provides additional temperature reductions in a skin employing a riblet appliqué.

Figure 5C:
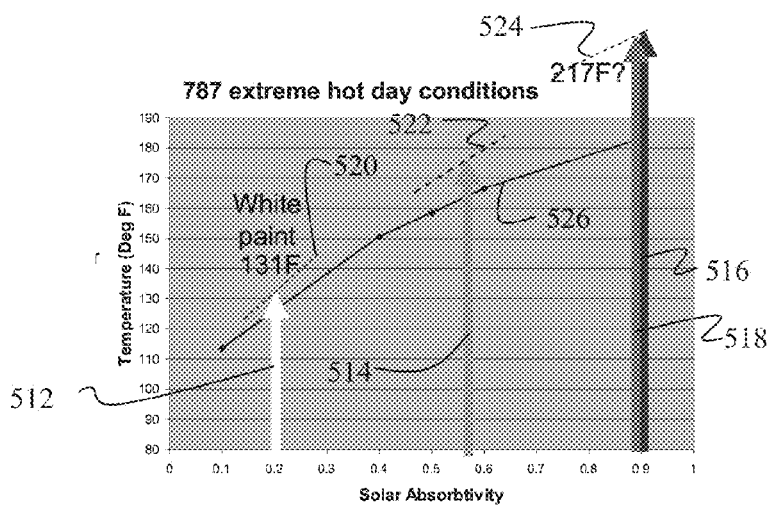
FIG. 5C is a graph showing relative heating rates for bright white, colored paints and riblet appliqués of varying colors.

In the graph in FIG. 5C, arrow 512 shows the solar absorptivity for a bright white surface, arrow 514 the absorptivity for a light gray surface and arrows 516 and 518 for blue and red surfaces as exemplary of dark colors. The typical heating ranges for the various colors are shown by the associated dashed lines 520, 522 and 524 respectively. The temperatures in FIG. 5C are steady state values calculated assuming a 130 F ambient temperature and a convection coefficient of 0.25 Btu/ft$^2$-hr-F representing natural convection. A solar radiative heat flux of 1120 W/m$^2$ with a 45 deg incidence angle is also applied to the riblets and surface layer/skin. Solid line 526 represents the exemplary heating for a riblet appliqué created with colors having solar absorptivity corresponding to the ordinate values. The solar absorptivity of the riblet tips will determine what the maximum hot day temperature would be for an exemplary CFRP skin as represented by the abscissa value for line 526.

Figure 6:
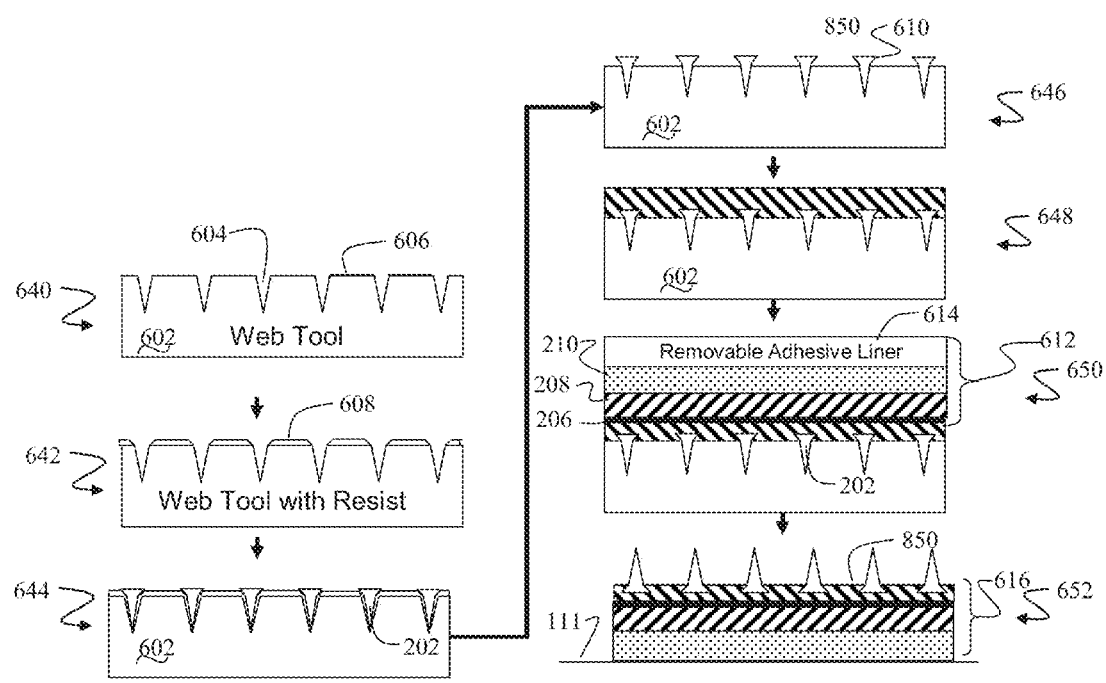
FIG. 6 is a flow diagram of an exemplary process for fabricating a multilayer appliqué of the embodiment of FIG. 2.

An exemplary process for creation of an appliqué as described for the embodiment in FIG. 2 is shown in FIG. 6. A web tool 602 is created in step 640 by impression on a master tool (not shown) which provides grooves 604 corresponding to the riblet shape. Spacing between the grooves provides a substantially flat intermediate surface 606 corresponding to the dimension 118 desired between the riblets 112 as previously discussed with respect to FIG. 1. A resist layer 608 is applied to the intermediate flat surfaces 606 in step 642. Riblet tips 202 with pigmented coloring or other spectral modification are then cast into the web tool 602 in step 644. The resist layer 608 prevents adherence of the elastomer or other casting material of the colored riblet tips to the intermediate flat surfaces to provide distinct riblet tips. In step 646 the resist, and any excess material prevented by the resist from adhering to the intermediate flat surfaces is removed with a wash. For the embodiment shown bases 610 of the riblet material are placed into relief extending from the tool by the casting over the resist. In alternative embodiments depending on riblet tip and surface layer materials and techniques for adherence of the riblet tips to the surface layer, the riblet bases may be flush with the intermediate flat surfaces 606. The surface layer 204 is then cast over the riblet tips 202 in step 646.

For the exemplary process shown with respect to FIG. 6 a preformed appliqué 612 incorporating the multilayer structure of aluminum foil as a metallic layer 206, polymer layer 208 and adhesive layer 210 is adhered to the cast surface layer in step 648. A removable adhesive liner 614 for preservation of the adhesive during further processing is shown. The completed multilayer appliqué 616 may then be applied to an airplane surface 111 by removing the adhesive liner 614 and adhering the adhesive layer 210 to the surface 111 as shown in step 650.

Figure 7:
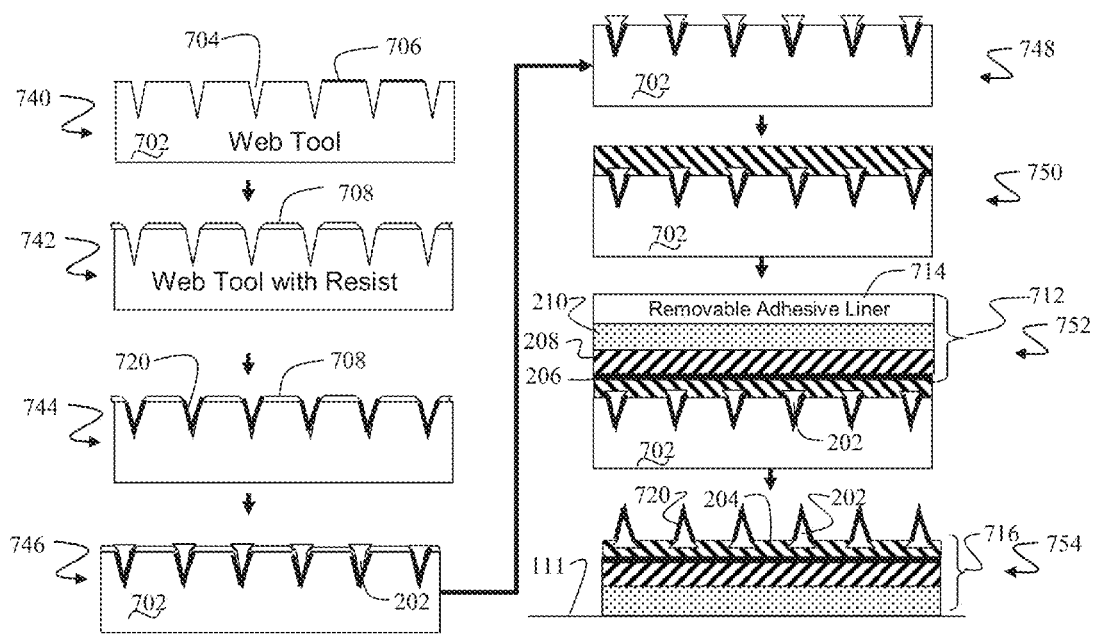
FIG. 7 is a flow diagram of an alternative process for fabricating a multilayer appliqué of the embodiment of FIG. 2.

An alternative process for creation of an appliqué as described for the embodiment in FIG. 2 is shown in FIG. 7. A web tool 702 is created in step 740 as previously discussed with respect to FIG. 6 with grooves 704 and intermediate surfaces 706. A resist layer 708 is applied to the intermediate flat surfaces 706 in step 742. A cladding 720 is cast, sputtered or formed into the grooves 704 in step 744 with the resist layer 708 preventing adherence to the intermediate flat surfaces. The cladding may include one or more layers to provide coloration for the riblet tips or other decorative appearance through the creation of interference colors. Exemplary cladding may be thin film conformal coatings incorporating inorganic, organic or polymeric matrices. Organic or inorganic additives/fillers for example inks or dip coating solutions may be included in the cladding or they may be a wide range of single and multilayered cladding that can be applied by surface modification, sputtering, physical deposition such as vapor or plasma deposition or chemical vapor depositions. Materials deposited include metals such as aluminum, gold indium, tin and chromium; oxides of metals; semiconductors such as tin oxide, cadmium stannate, or antimony sulfide; or they may be organics/polymers such as perylenes, porphyrins, phthalocyanines, fluoropolymers or organometallics. The cladding may be electrodeposited materials including metals and metal oxides or conductive polymers; or those cladding deposited by electrophoresis in single or muitilayers for example nanolayered metals, polymers and oxides deposited by Modumental. The cladding may be used as additional coloration or decorative effects with coloration in the riblet tip material as well or as the sole source of coloration. Coatings such as quantum dots may be employed for additional spectral tailoring as will be described subsequently. Riblet tips 202 are then cast into the web tool 702 in step 746. The resist layer 708 prevents adherence of the elastomer or other casting material of the riblet tips to the intermediate flat surfaces to provide distinct riblet tips. In step 748 the resist is removed. For the embodiment shown bases 710 of the riblet material are placed into relief extending from the tool by the casting over the resist. In alternative embodiments depending on riblet tip and surface layer materials and techniques for adherence of the riblet tips to the surface layer, the riblet bases are flush with the intermediate flat surfaces. The surface layer 204 is then cast over the riblet tips 202 in step 750.

For embodiments where coloration is obtained solely from the cladding and the material for the riblet tips and the surface layer are the same, the riblet tips and surface layer may be deposited onto the tool in two steps without the use of a resist. Thin multilayered conformal thin film coatings are done routinely by various deposition processes such as sputtering or spray coating either in batch operations or via roll-to-roll processing where one coating (for the cladding) is applied followed immediately down stream (or in a separate processing step) by the application of the second layer (the riblet tip) followed by the application of the third layer (surface layer).

For the exemplary process shown with respect to FIG. 7 a preformed appliqué 712 incorporating the multilayer structure of aluminum foil as a metallic layer 206, polymer layer 208 and adhesive layer 210 is adhered to the cast surface layer in step 752. A removable adhesive liner 714 for preservation of the adhesive during further processing is shown. The completed multilayer appliqué 716 may then be applied to an airplane surface 111 by removing the adhesive liner 614 and adhering the adhesive layer 210 to the surface 111 as shown in step 650.

Figure 8:
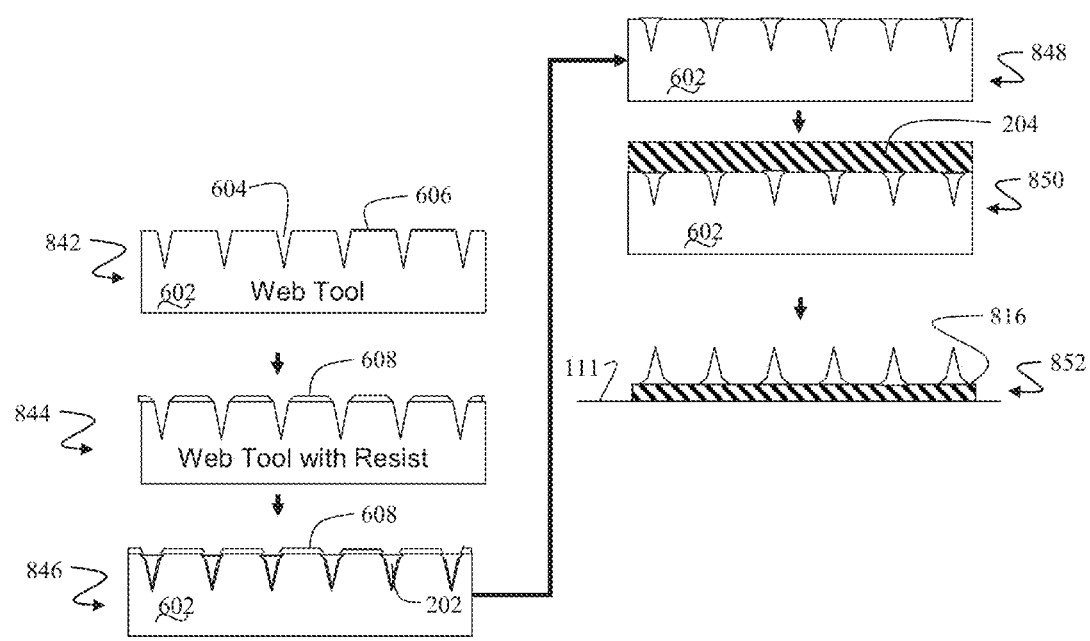
FIG. 8 is a flow diagram of a process for fabricating a multilayer appliqué of the embodiment of FIG. 3.

An exemplary process for creation of an appliqué as described for the embodiment in FIG. 3 is shown in FIG. 8. A web tool 802 is created in step 840 by impression on a master tool (not shown) which provides grooves 804 corresponding to the riblet shape. Spacing between the grooves provides a substantially flat intermediate surface 806 corresponding to the dimension 118 desired between the riblets 112 as previously discussed with respect to FIG. 1. A resist layer 808 is applied to the intermediate flat surfaces 806 in step 842. Riblet tips 202 with pigmented coloring or other coloring or spectral modification are then cast into the web tool 802 in step 844, The resist layer 808 prevents adherence of the elastomer or other casting material of the colored riblet tips to the intermediate flat surfaces to provide distinct riblet tips. In step 846 the resist is removed. For the embodiment shown the cast riblets are flush with the intermediate flat surface portions. A thermally-reactive or thermoplastic surface layer 204 is then cast or laminated over the riblet tips 202 in step 846.

In alternative embodiments, the colored riblet 202 may be formed without resist by casting for example, so that the colored riblet tips are "filled" or nearly filled and the intermediate flat surfaces 806 are not coated (for example where a blade is drawn along the surface of the tooling and the riblet tips are filled while the flat surfaces are wiped clean) This can be accomplished in a single roll coating run with multiple coating stations where the riblets are cast and dried/partially cured followed by the application of the white surface layer 204 at the second coating station.

The completed appliqué 816 may then be applied to an airplane surface 111 by pressure and heating the material of the surface layer 204 and adhering it to the surface 111 as shown in step 848.

Figure 9:
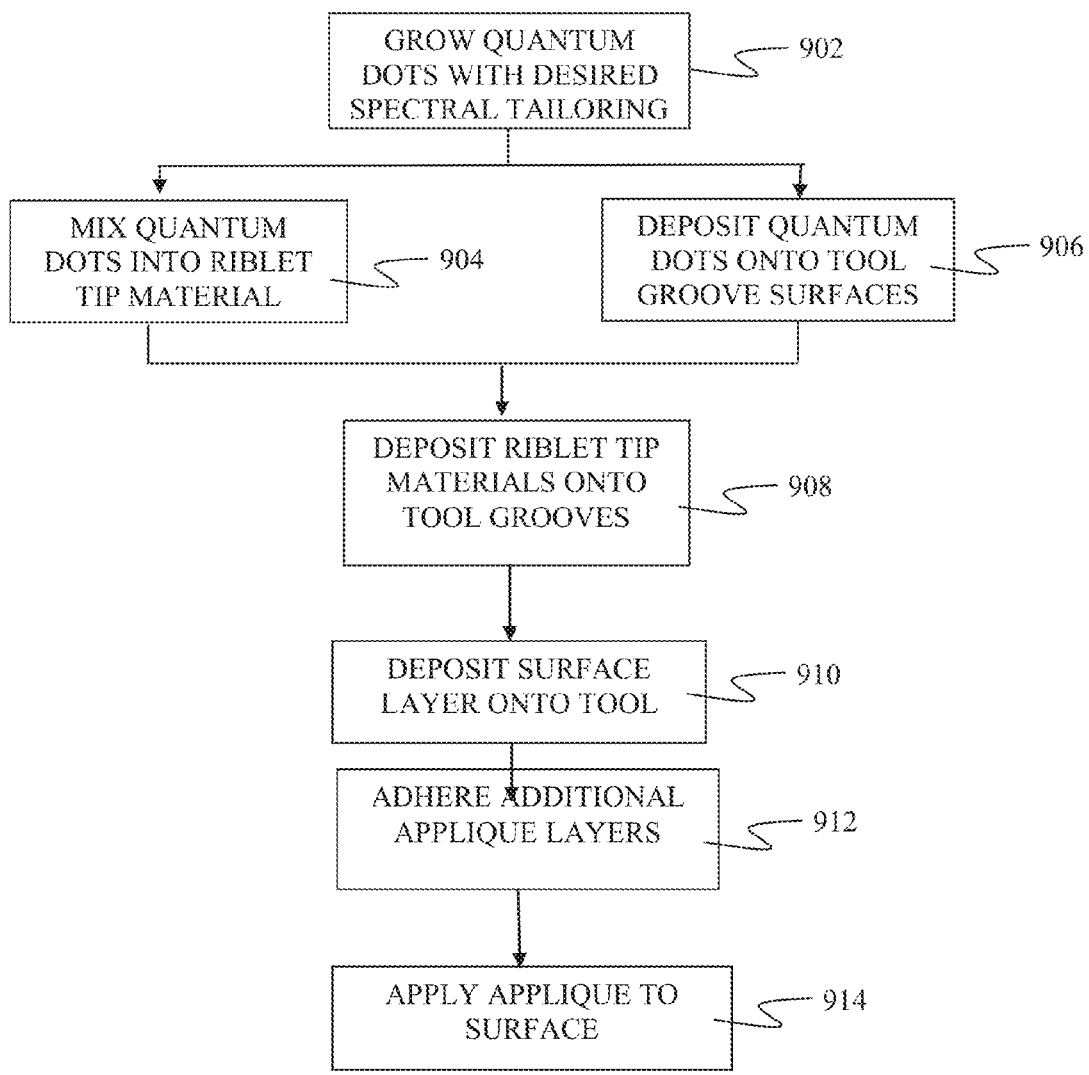
FIG. 9 is a flow chart of a method for creating riblet tips with spectral modification using quantum dots for the embodiments previously described.

As previously discussed, tailoring of spectral reflection properties of the riblets in addition to coloration may be accomplished to further reduce heating of the surface. In one embodiment, the spectral tailoring may be enhanced through the use of mutilayered thin film cladding on the riblet surfaces by processes such as sputtering. These multilayered coatings may form interference layers that allow the design of the desired color in the visible with high reflectivity in the near infrared and/or UV. In another exemplary embodiment described in FIG. 9, Quantum dots are grown to provide for spectral tailoring with a reduced heat load (absorbing UV for example but also reemitting in the visible or near IR), step 902. The quantum dots are then distributed into the riblet tips by either mixing into the base material for casting the riblets to distribute the quantum dots into the matrix of the riblet tip material, step 904, to create an embodiment similar to that described for the process of FIG. 6 or by a thin film conformal coating on top of the preformed riblets or by depositing the quantum dots into a web tool as a cladding, step 906, to create an embodiment similar to that described for the process of FIG. 7. The riblet tip material is then deposited or formed in the grooves of the tool, step 908, and the surface layer deposited onto the intermediate flat surfaces, step 910. If coloration or spectral tailoring of the riblet tips is accomplished exclusively by the quantum dots and the riblet tips and surface layer are a common material, the deposition of the riblet tips and surface layer may be accomplished as a single step. Surfactants or pendant organic moieties on the quantum dots may also be used to preferentially arrange the quantum dots near the riblet tool surfaces allowing the cladding and riblet casting to be performed in a single step. Any additional layers to create an appliqué are then deposited on or applied to the surface layer, step 912 and the appliqué is then adhered to the structural surface, step 914.

Figure 10A:
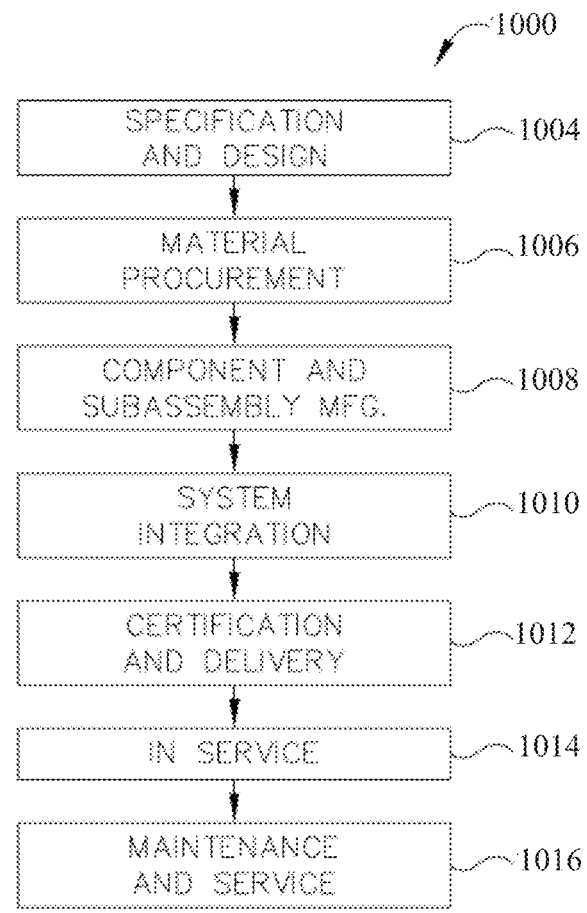
FIG. 10A is a flow diagram describing use of the rigid tipped riblets embodiments disclosed herein in the context of an aircraft manufacturing and service method.
Figure 10B:
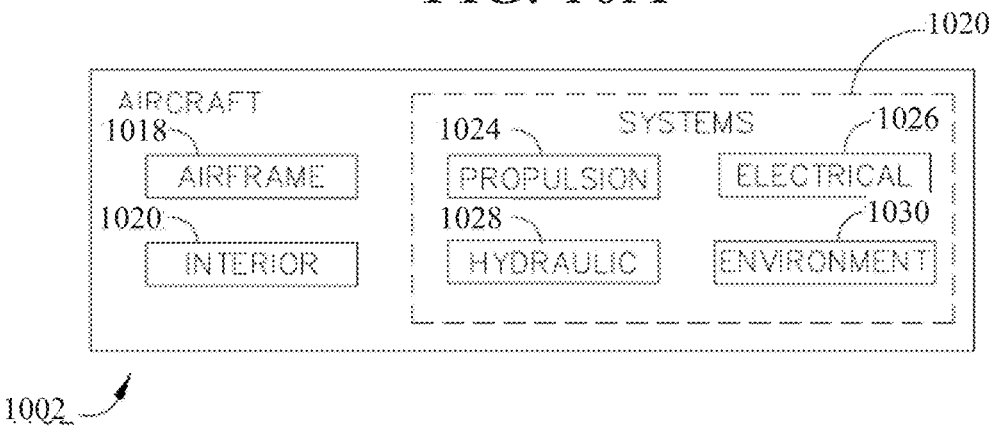
FIG. 10B is a block diagram representing an aircraft employing the rigid tipped riblets with embodiments as disclosed herein.

Referring more particularly to FIGS. 10A and 10B embodiments of the high elongation elastomeric or rigid-tipped riblets disclosed herein and the methods for their fabrication may be described in the context of an aircraft manufacturing and service method 1000 as shown in FIG. 10A and an aircraft 1002 as shown in FIG. 10B. During pre-production, exemplary method 1000 may include specification and design 1004 of the aircraft and material procurement 1006. During production, component and subassembly manufacturing 1008 and system integration 1010 of the aircraft takes place. The riblet appliqués and their manufacturing processes as described herein may be accomplished as a portion of the production, component and subassembly manufacturing step 1008 and/or as a portion of the system integration 1010. Thereafter, the aircraft may go through certification and delivery 1012 in order to be placed in service 1014. While in service by a customer, the aircraft 1002 is scheduled for routine maintenance and service 1016 (which may also include modification, reconfiguration, refurbishment, and so on). The riblet appliqués as described herein may also be fabricated and applied as a portion of routine maintenance and service 1016.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10B, the aircraft 1002 produced by exemplary method 1000 may include an airframe 1018 having a surface 111 as described with respect to FIG. 1 and a plurality of systems 1020 and an interior 1022. Examples of high-level systems 1020 include one or more of a propulsion systems 1024, an electrical and avionics system 1026, a hydraulic system 1028, and an environmental system 1030. Any number of other systems may be included. The high elongation elastomeric or rigid-tipped riblets supported by the embodiments disclosed herein may be a portion of the airframe 1018, notably the finishing of skin and exterior surfaces. Although an aerospace example is shown, the principles disclosed in the embodiments aerodynamic riblet appliqués herein may be applied to other industries, such as the automotive industry, wind power generation industry and the marine/ship industry.

Apparatus and methods embodied herein may be employed during any one or more of the stages of the production and service method 1000. For example, components or subassemblies corresponding to production process 1008 may be fabricated or manufactured in a manner similar to components or subassemblies produced while the aircraft 1002 is in service. Also, one or more apparatus embodiments, method embodiments, or a combination thereof may be utilized during the production stages 1008 and 1010, for example, by substantially expediting assembly of or reducing the cost of an aircraft 1002. Similarly, one or more of apparatus embodiments, method embodiments, or a combination thereof may be utilized while the aircraft 1002 is in service, for example and without limitation, to maintenance and service 1016.

Having now described various embodiments in detail as required by the patent statutes, those skilled in the art will recognize modifications and substitutions to the specific embodiments disclosed herein. Such modifications are within the scope and intent of the present disclosure as defined in the following claims.

What is claimed is:

1. An array of riblets comprising:
   a bright white surface layer having particulates selected from a set of titanium dioxide, zinc oxide, zinc sulfide, antimony oxide, zirconium oxide and
   tips with pigmented coloration different from the color of the bright white surface layer and spaced to protrude from the surface layer.

2. The array of riblets as defined in claim 1 wherein the pigmented coloration is selected from a set of organics including perylene black, perylene reds, blue or green phthalocyanine pigments and stable yellow organics transparent in the near infrared.

3. The array of riblets as defined in claim 2 wherein the surface layer and spaced tips are elastomeric polymers selected from a set including polyurethanes, polyureas, polysulfides, epoxy-based elastomers, silicones, perfluoroethers, fluorosilicones, EPDM elastomers.

4. The array of riblets as defined in claim 1 wherein the surface layer and spaced tips are elastomers selected from a set including polyurethanes, polyureas, polysulfides, epoxy-based elastomers, silicones, fluoroelastomers including perfluoroethers, fluorosilicones, EPDM elastomers, non-elastomeric polymers including thermosets and thermoplastics including materials such as polyurethanes, polyureas, epoxy, fluorinated ethylene propylene (FEP), polyolefins, polyetheretherketone (PEEK), Polyetherketoneketone (PEKK) or polyamide.

5. The array of riblets as defined in claim 4 wherein the spaced tips are parabolic in cross section.

6. The array of riblets as defined in claim 1 wherein the pigmented coloration is selected from a set of chromium oxide, lead chrome; Molybdate Orange; cadmium sulfide pigments; chrome titanate yellow; and bismuth vanadate/molybdate pigments.

7. The array of riblets as defined in claim 1 wherein the bright white surface layer incorporates particulates having a size range 0.1-0.5 micrometers to maximize reflection in the UV, visible and near infrared.

* * * * *